April 17, 1956 W. L. HUGHES 2,742,363

METHODS OF MAKING CARBONATED BEVERAGES
AND PREPARATIONS FOR USE THEREIN

Filed Aug. 1, 1952

INVENTOR.
Walter L. Hughes.
BY
Knight & Rodgers
ATTORNEYS.

United States Patent Office 2,742,363

Patented Apr. 17, 1956

2,742,363

METHODS OF MAKING CARBONATED BEVERAGES AND PREPARATIONS FOR USE THEREIN

Walter L. Hughes, Cambridge, Mass.

Application August 1, 1952, Serial No. 302,142

2 Claims. (Cl. 99—78)

This invention relates to the making of carbonated beverages, and more particularly to methods of making such beverages and preparations of materials for use therein.

The principal object of the invention is to provide methods and preparations of materials whereby a desired quantity of carbonated beverage may be made quickly and easily, and at moderate expense, by bringing suitable materials in solid form in contact with a quantity of water or aqueous solution.

A further object is to provide such methods and preparations for making a carbonated beverage that do not result in the presence in the completed beverage of any dissolved substance whose presence would render the beverage unpalatable or otherwise objectionable.

A further object of the invention is to provide methods and means of making a carbonated beverage by bringing water or aqueous solution into contact with dry solid materials to form carbonic acid solution by reaction of such materials without leaving any objectionable constituent dissolved in the water, and thereafter separating the solution and undissolved reaction products.

In accordance with my invention, I produce carbonic acid in solution in water by reaction of acidic material with an alkali metal bicarbonate, and remove from the solution at least a substantial proportion of the alkali metal derived from the bicarbonate, by ion exchange reaction with a suitable ion exchange resin on the hydrogen cycle, that is, in the acid form in which it contains exchangeable hydrogen ions. The carbonic acid solution and the undissolved resin containing the exchanged alkali metal ions are then separated from each other to provide a carbonated solution free from the undissolved resin and from any objectionable amount of dissolved alkali metal. This carbonated solution can be used as a beverage either directly or by further compounding it with other ingredients, such as flavoring agents, sugars, or liquors. If desired, such additional ingredients may be added to the water prior to or during the formation of carbonic acid or the removal of the alkali metal ions and may, if desired, be introduced along with the bicarbonate or the resin or both.

The resin employed is a cation exchange resin containing a strong acid group, and I have found that ion exchange resins of the sulfonic acid type are especially suitable for this purpose.

The ion exchange resin may itself be employed as the acidic material to produce carbonic acid by reaction with the alkali metal bicarbonate. In such cases, the alkali metal bicarbonate and the resin may be brought into contact with the desired quantity of cold water. The bicarbonate dissolves, and its alkali metal ions exchange with the hydrogen ions of the resin, producing carbonic acid which remains dissolved in the water, and at the same time effecting the removal from the solution of alkali metal ions which if allowed to remain in the solution would make it unpalatable.

It is also within the scope of my invention, however, to employ in addition to the ion exchange resin another acid such as citric acid or other weak organic acid that is soluble in water, and such other acid may provide part or all of the acidic material that reacts with the alkali metal bicarbonate to form carbonic acid. In this case, the other acid reacts with part or all of the bicarbonate to form carbonic acid and an alkali metal salt of such other acid, and the ion exchange resin acts to remove from the solution the alkali metal ions of such salt and to reform the other acid. It will be seen, therefore, that in this case also a substantial proportion of the alkali metal ions derived from the bicarbonate are removed from the solution by ion exchange reaction with the resin.

The invention is particularly useful in making individual quantities of beverage for consumption, in which each quantity of beverage is prepared separately in a vessel such as a drinking glass. For this purpose, according to one embodiment of the invention, suitable quantities of the solid resin and bicarbonate, in divided condition, either with or without another acid such as mentioned above, may be first mixed or compounded together to form a preparation containing an amount of each sufficient to produce the desired degree of carbonation in a certain quantity of beverage. The mixed or compounded quantities of solids are mixed with the proper quantity of water, preferably by placing the compounded solids in a drinking glass and then adding the water, or alternatively by first putting the water in a glass and then introducing the compounded solids.

For convenience in distribution, handling and use, the compounded solids for use in the above described embodiment of the invention may be enclosed in a container formed at least in part of pervious material. The container with the solid materials therein, and the desired quantity of water, are then placed in the drinking glass or other vessel, and stirred to promote thorough contact of the materials with the water. When the reaction is complete, the container with remaining solid materials may be removed from the vessel, thus separating the carbonated solution from the solids by filtration through the pervious material of the container.

The process may be carried out according to various other procedures, and other forms of preparations or devices may be employed, and certain of these other possible embodiments or modifications will be described hereinafter.

The accompanying drawings illustrate certain forms of preparations and devices and their use, in accordance with this invention and, referring thereto:

Figure 1:
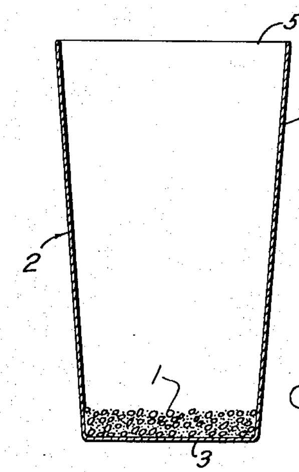
Fig. 1 is a vertical section of one form of preparation comprising a container formed at least in part of pervious material and a body of compounded solid materials therein.

Ion exchange resins of the sulfonic acid type, when in the acid form containing exchangeable hydrogen ions, may be represented by the general formula $R.SO_3H$. Various resins of this type and methods of preparing them are known. For example, I may use sulfonated styrene divinyl benzene copolymer, sulfonated phenol formaldehyde resin, or any other sulfonic acid cation exchange resin that will not impart unpalatable, toxic, or other objectionable characteristics to aqueous solutions. Examples of resins of this type are mentioned on pages 54 and 55 of "Ion Exchange Resins" by Kunin and Myers, published in 1950 by John Wiley & Sons, Inc.

In order to provide a carbonated solution suitable for use as a beverage, I use a bicarbonate of a non-toxic alkali metal such as sodium or potassium, and I prefer to use sodium bicarbonate.

For use in making a quantity of carbonated beverage, the quantities of resin and bicarbonate used are dependent on the quantity of carbonated beverage to be produced. The quantity of alkali metal bicarbonate should be sufficient to provide the desired degree of carbonation, and is preferably sufficient to produce the desired quantity of 0.08 molal solution of carbonic acid. For example, 1.5 gm. of sodium bicarbonate is sufficient to produce 8 oz. of carbonated beverage. The amount of the ion exchange resin is sufficient to remove a substantial proportion of the alkali metal ions from the solution, so as to reduce the alkali metal concentration to a palatable level. For best results, the quantity of resin should be at least substantially stoichiometrically equivalent to the bicarbonate, and generally is preferably slightly in excess of stoichiometric in order to insure complete removal of alkali metal ions from solution.

I have found, for example, that about 10 grams of sulfonated styrene divinyl benzene copolymer is sufficient to provide complete ion exchange reaction and formation of carbonic acid with 1.5 gm. sodium bicarbonate. The amount of resin required depends upon the specific composition and ion exchange capacity of the resin used. For any particular resin, it may be determined experimentally by adding the resin in small increments to a measured amount of sodium bicarbonate dissolved in a small amount of warm water. Each portion of resin added will cause a vigorous effervescence until an excess has been added.

In making a preparation containing both the ion exchange resin and the alkali metal bicarbonate, the proper quantities of resin and bicarbonate are mixed or compounded together in divided condition. For example, a compounded mixture suitable for making 8 oz. of carbonated beverage may comprise approximately 1.5 gm. of sodium bicarbonate and approximately 10 gm. of sulfonated styrene divinyl benzene copolymer. It is not necessary to thoroughly intermix these ingredients before mixing with the water, due to the ready solubility of the alkali metal bicarbonate. The alkali metal bicarbonate is preferably in powdered or finely divided condition. The resin is preferably used in granular or bead form, for example, in the form of particles from a few tenths of a millimeter to about 1 millimeter in diameter.

Figure 2:
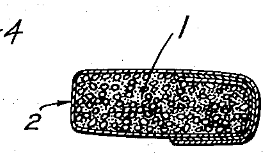
Fig. 2 is a vertical section thereof, showing the container wrapped about the contained solids to form a package.
Figure 3:
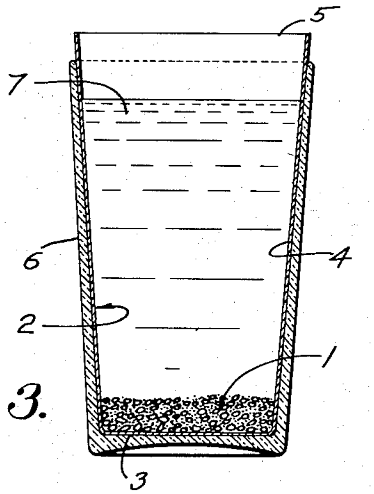
Fig. 3 is a vertical section showing the container and solids in place in a drinking glass, in preparation for making a beverage.

In making a prepartion such as illustrated in Figs. 1–3, and referring particularly to Fig. 1, a body of divided solids comprising the compounded quantities of resin and bicarbonate may be placed, as indicated at 1, within a container 2, of which at least the lower part is formed of water-pervious paper, cloth or other flexible material readily permeable by, but insoluble in water. In Figs. 1–3, the container 2 is shown as formed entirely of flexible permeable filtering material such as mentioned above, that is, of material that is pervious to water but impervious to the solid particles of the resin. The container 2 is advantageously of a shape and size to fit within a drinking glass or other vessel in which the beverage is to be made, and is preferably of a shape and size conforming substantially to the inside of such vessel.

The container 2 is shown as generally circular in shape, having a pervious bottom wall 3 and a pervious side wall 4. It is shown as formed with an opening 5 at its upper end, to permit introduction of the solid materials therein, and also permit introduction of a rod, spoon or other implement for stirring the contents during the making of a beverage.

For storage, distribution and handling, the container 4 may be folded or closed over the body of solid material 1 and wrapped upon itself to form a compact package as indicated in Fig. 2, and may be retained in this form until it is to be used, as by wrapping with string or by any other suitable detachable securing means.

When the above described preparation is to be used, the container 2 may be opened and placed in a drinking glass 6, as shown in Fig. 3, with the resin and bicarbonate held in the lower portion of the container 2. The desired quantity of water is also placed in the glass 6 as indicated at 7, preferably by pouring the water into the open container after inserting the container and its contents in the glass. For proper retention of carbon dioxide to effect satisfactory carbonation, the water should be cold, below ordinary room temperature. For best results, I prefer to use ice and water or water that has been otherwise cooled to about 40° F. or below.

The water and solid materials are preferably agitated within the container 2, as by stirring with a rod, spoon or other implement, so as to provide thorough contact and rapid and complete reaction.

The alkali metal bicarbonate dissolves quickly in the water, and the dissolved alkali metal ions exchange with the hydrogen ions of the resin to produce carbonic acid, which dissolves in the water, and to effect removal of alkali metal ions from the solution. The reaction is as follows:

$$R.SO_3H + NaHCO_3 = R.SO_3Na + H_2CO_3$$

Part of the carbonic acid dissociates to form carbon dioxide in solution, as follows:

$$H_2CO_3 = CO_2 + H_2O$$

During the ion exchange reaction, some evolution of bubbles of carbon dioxide gas occurs but, if the water is sufficiently cold, most of the carbon dioxide is retained in the water in the form of carbonic acid and dissolved carbon dioxide.

It ordinarily requires about one to three minutes to complete the reaction. When the reaction is complete, as indicated by lack of any further evolution of carbon dioxide gas bubbles, the container 2 may be removed from the water and from the glass 6. The resin particles, containing the exchanged alkali metal ions, are retained within the container 2 and are removed therewith. As the container is removed, the carbonated solution passes through the pervious bottom and side walls thereof so as to effect separation of the resin particles from the solution by filtration.

Figure 4:
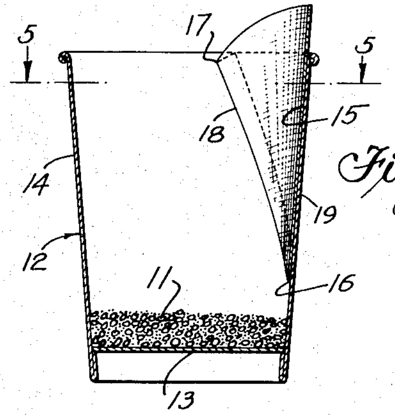
Fig. 4 is a vertical section of another form of preparation in accordance with the invention, showing a different form of container provided with a pervious filter member and a body of compounded solid materials therein.
Figure 6:
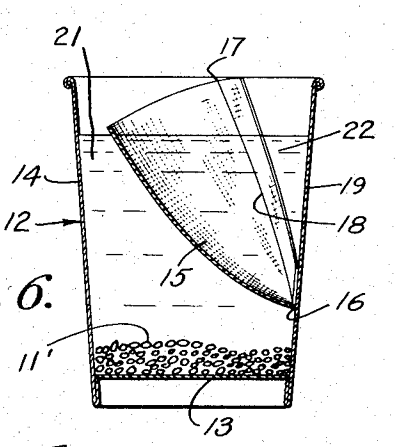
Fig. 6 is a vertical sectional showing the container of Fig. 6 with a carbonated solution therein and with the filter member in position for use in separating the solution from undissolved solids.
Figure 5:
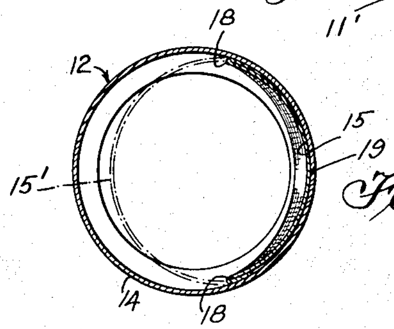
Fig. 5 is a horizontal section on line 5—5 in Fig. 4, with the body of solid materials omitted.

In the modified form of preparation shown in Figs. 4–6, the body of divided solid materials indicated at 11 may be substantially the same as the body 1 described above, containing the desired quantities of the resin and bicarbonate. In this case, however, the container is shown as comprising a drinking vessel 12 similar to an ordinary paper drinking cup, having a bottom wall 13 and an upwardly flaring side wall 14 formed of relatively stiff or rigid material substantially impervious to water, such as waterproof paper or cardboard. The body of solid material 11 is placed in the bottom of the container.

A filter member 15 of thin flexible pervious material such as cloth or filter paper is secured in position within the container. The filter member 15 extends upwardly from a position substantially below the top of the container, as at 16, to a position adjacent the top of the container and above the normal liquid level therein, as at 17. It has two side edge portions 18 meeting at 16 and tightly secured, as by cementing, to the side wall 14 of the container, so as to form a flexible filtering wall or partition separating the space between it and the adjacent portion 19 of the container wall from the remainder of the space within the container, in which the body of solid material 11 is located.

The filter member 15 is flexible and is of such configuration as to be movable by flexing to a folded position in which it lies close to and fits snugly against the container wall portion 19, as indicated in Fig. 4 and in solid lines in Fig. 5, and to an extended position in which it is spaced from the container wall portion 19, as indicated in Fig. 6 and in broken lines at 15' in Fig. 5.

During storage and handling of the preparation prior to use, the filter member 15 is disposed in the folded position of Fig. 4, which permits a number of such containers, each containing a body of the compounded solid materials, to be assembled in a compact stack by telescoping within each other in a manner similar to that employed with ordinary paper cups.

In making a carbonated beverage with this form of preparation, the desired quantity of cold water is introduced into the container 12 through the open upper end thereof, while the filter member 15 remains in its folded position, and is thus brought into contact with the body of solid material 11 containing the resin and the bicarbonate. The water and solid materials are preferably stirred or otherwise agitated within the container, as before, resulting in dissolution of the bicarbonate and ion exchange reaction thereof with the resin to produce carbonic acid in solution and remove alkali metal ions from the solution, in the same manner as described above.

When the reaction is complete, the resin particles containing the exchanged alkali metal ions remain undissolved within the container, as indicated at 11' in Fig. 6, the body of carbonated beverage being indicated at 21. The filter member 15 may then be moved to the extended position as shown in Fig. 6, to provide an enlarged space 22 between the filter member and the container wall portion 19. The shape of the filter member 15 is such that the upper edge thereof is wholly above the normal liquid level when in this extended position. The carbonated solution or beverage may be consumed by drinking from this space 22, the filter member 15 permitting the solution to pass into such space readily while preventing passage of the resin particles 11' and thus separating the resin particles from the solution.

In either of the above described embodiments of the invention I may use, in addition to the ion exchange resin and the alkali metal bicarbonate, a weak organic acid stronger than carbonic acid. For example, citric acid may be added as a flavoring constituent. Other non-toxic carboxylic acids that do not impart an objectionable taste, such as acetic or tartaric acid, may also be used. Such an acid may either be dissolved in the water prior to contact thereof with the above described ingredients, or if solid it may be mixed or compounded in solid form with the resin and the bicarbonate so as to be dissolved in the water concurrently with the bicarbonate. For example, I may use a compounded preparation containing approximately 1.5 gm. of sodium bicarbonate, 10 gm. of sulfonated styrene divinyl benzene copolymer, and 1 gm. of citric acid.

If citric acid or other weak organic acid stronger than carbonic acid is present during the dissolution of the alkali metal bicarbonate, it first reacts with the bicarbonate to form carbonic acid and an alkali metal salt of the organic acid, in the solution, and the alkali metal ions so derived from the bicarbonate are then removed from the solution by ion exchange reaction with the resin, which also reacts with any remaining alkali metal bicarbonate in the same manner as before. Otherwise, the procedure and results are the same as described above, except that the added organic acid is also present in the final carbonated beverage.

The ion exchange resin and the alkali metal bicarbonate are not necessarily mixed or compounded together before bringing them in contact with water but may, if desired, be separately introduced into or otherwise contacted with the water, either simultaneously or successively. For example, an aqueous solution of the alkali metal bicarbonate prepared in any suitable manner may be mixed with or otherwise brought into contact with the ion exchange resin, and various means or devices may be employed to effect such contact.

An advantageous form of preparation or device for this purpose comprises a filtering cartridge containing a quantity of ion exchange resin such as described above, through which a corresponding quantity of alkali metal bicarbonate solution may be passed to effect the desired ion exchange reaction.

Figure 7:
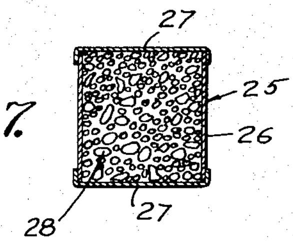
Fig. 7 is a sectional view of another form of preparation for use in accordance with my invention, comprising a filtering cartridge containing a quantity of ion exchange resin.

Fig. 7 illustrates one form of such a preparation or device, comprising a cartridge 25 having a cylindrical side wall 26 of rigid material such as waterproof cardboard or plastic and two end walls 27 formed of pervious filtering material such as cloth cemented or otherwise secured to the ends of the cylindrical wall. A predetermined quantity of a cation exchange resin such as described above is placed within this cartridge, as indicated at 28, at a suitable stage in the manufacture thereof. The quantity of resin is determined in accordance with the same principles as in the embodiments described above. For example, a cartridge containing approximately 10 grams of sulfonated styrene vinyl benzene copolymer may be used in the production of 8 oz. of carbonated beverage.

Figure 8:
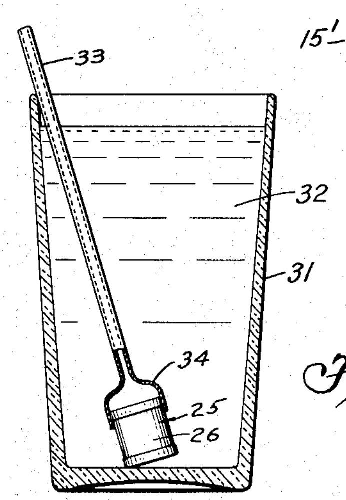
Fig. 8 is a vertical section illustrating the use of the cartridge shown in Fig. 7, in conjunction with a device for drawing a quantity of solution therethrough from a vessel containing the solution.

In using such a cartridge, as illustrated in Fig. 8, a predetermined quantity of alkali metal bicarbonate may be first dissolved in a corresponding quantity of water in a drinking glass or other vessel 31. The bicarbonate may be added in powdered form or in the form of a tablet prepared by compounding the bicarbonate with a suitable water-soluble binding agent, and may be dissolved in the water to form a quantity of aqueous solution thereof as indicated at 32. For example, approximately 1.5 gm. of sodium bicarbonate may be dissolved in 8 oz. of water.

A convenient form of device for use in conjunction with the cartridge 25 may comprise an open-ended tube 33 formed of plastic or other suitable material and having at its lower end a bell-shaped enlargement 34 adapted to receive and hold such a cartridge. The cartridge 25 may be inserted in the enlargement 34, and then introduced into the vessel 31. The tube 33 with the cartridge attached to the lower end thereof may be employed to stir the water to facilitate dissolution of the alkali metal bicarbonate.

The upper end of tube 33 may then be placed in a person's mouth, and the solution may be sucked or drawn from the vessel, upward through the cartridge 25 and the tube 33. In passing through the cartridge, the dissolved alkali metal bicarbonate reacts with the resin to form carbonic acid and the alkali metal ions are removed from the solution, so that the beverage delivered through the tube is carbonated and substantially free from alkali metal.

In this case also, a suitable quantity of a weak organic acid such as citric acid may be used in addition to the ion exchange resin. Such an acid may be dissolved in the water along with the alkali metal bicarbonate, in which case it reacts with the bicarbonate to form a carbonated solution containing an alkali metal citrate or other salt, and the alkali metal ions are subsequently removed upon contact of such solution with the resin in passing through the cartridge 25. Such an acid may, if desired, be mixed or compounded with the resin in the cartridge 25, in which case, as the alkali metal bicarbonate solution passes through the cartridge, the acid reacts therewith to form carbonic acid and the alkali metal ions are removed by ion exchange reaction with the resin.

I claim:

1. The method of making a carbonated beverage that comprises introducing a body of water into a container formed at least in part of pervious filtering material and containing an alkali metal bicarbonate and an ion exchange resin of the sulfonic acid type on the hydrogen cycle, to cause dissolution of said bicarbonate, and cause ion exchange reaction between said bicarbonate and said resin with formation of carbonic acid in solution in the water and replacement of hydrogen ions in said resin by alkali metal ions; and then separating the solution from the resin particles by filtration through the pervious material.

2. A preparation for use in making a carbonated beverage comprising: a container formed at least in part of water-pervious filtering material; and a body of divided solid material within said container, said solid material containing a quantity of alkali metal bicarbonate and a quantity of an ion exchange resin of the sulfonic acid type on the hydrogen cycle, said quantity of resin being at least substantially stoichiometrically equivalent to said quantity of bicarbonate.

References Cited in the file of this patent

UNITED STATES PATENTS

| | | |
|---|---|---|
| 2,463,962 | Gorcica | Mar. 8, 1949 |
| 2,682,468 | Frampton | June 29, 1954 |

OTHER REFERENCES

"Ion Exchange Resins" by R. Kunin and R. J. Myers. Copyright 1950 by J. Wiley & Sons, Inc., pub. by John Wiley & Sons, Inc., New York, pages 93, 94.